US008491045B2

(12) United States Patent
Ameloot et al.

(10) Patent No.: US 8,491,045 B2
(45) Date of Patent: Jul. 23, 2013

(54) VEHICLE BODY SIDE STRUCTURE

(75) Inventors: Kenneth Ameloot, Roseville, MI (US); Jeff Pencak, Howell, MI (US); Jeff Doyle, Dexter, MI (US)

(73) Assignee: Nissan North America, Inc., Franklin, TN (US)

( * ) Notice: Subject to any disclaimer, the term of this patent is extended or adjusted under 35 U.S.C. 154(b) by 331 days.

(21) Appl. No.: 12/697,039

(22) Filed: Jan. 29, 2010

(65) Prior Publication Data

US 2011/0187155 A1 Aug. 4, 2011

(51) Int. Cl.
B62D 25/02 (2006.01)

(52) U.S. Cl.
USPC ............. 296/193.05; 296/191; 296/203.03; 296/201; 29/401.1

(58) Field of Classification Search
USPC ........ 296/193.05, 203.03, 201, 191; 29/401.1
See application file for complete search history.

(56) References Cited

U.S. PATENT DOCUMENTS

| 4,717,197 A * | 1/1988 | Harasaki ................. 296/193.05 |
| 4,978,164 A * | 12/1990 | Nakamura et al. ....... 296/193.04 |
| 5,362,120 A * | 11/1994 | Cornille, Jr. ............ 296/203.01 |
| 5,475,956 A * | 12/1995 | Agrawal et al. ................ 52/208 |
| 5,660,427 A * | 8/1997 | Freeman et al. ......... 296/190.08 |
| 5,676,418 A * | 10/1997 | Strefling .................... 296/180.1 |
| 7,520,560 B2 * | 4/2009 | Frank et al. ............. 296/193.05 |
| 2001/0005092 A1 * | 6/2001 | Sakyo et al. ............ 296/190.08 |

OTHER PUBLICATIONS

Campervanconversion article at http://www.campervanconversion.co.uk/fitting-van-windows, dated to May 2, 2008 via the WayBack Machine.*
Internet Archive WayBackMachine, Commercial Vehicles, Volkswagen, 2008, http://web.archive.org/web/20080203091636/htttp:www.vwn-aufbaurichtlinien.de/en/models/transporter-t5/4-modifications-to-panel-van-versions-kombi-and-panel-van/41-sidewall-apertures-retrofitting-of-windows/.*
Pictures of Side Panel Exterior and Side Panel Interior of Chevy Express.
Pictures of Side Panel Exterior and Side Panel Interior of Ford E-Series.
Pictures of Side Panel Exterior and Side Panel Interior of Dodge Sprinter.

* cited by examiner

*Primary Examiner* — Dennis Pedder
(74) *Attorney, Agent, or Firm* — Global IP Counselors, LLP

(57) ABSTRACT

A vehicle body side structure includes an outer side panel and an inner side panel. The outer side panel has an outer window area and a window sash formed adjacent to and surrounding the outer window area. The outer window area includes a removable portion that spans the outer window area. The inner side panel has an inner window area and an attachment flange formed adjacent to and surrounding the inner window area. The attachment flange is rigidly attached to the window sash along a connection area to prevent movement of the inner side panel relative to the outer side panel. The removable portion of the outer window area is located adjacent to the connection area.

20 Claims, 15 Drawing Sheets

VEHICLE BODY SIDE STRUCTURE

BACKGROUND

1. Field of the Invention

The present invention generally relates to a vehicle body side structure. More specifically, the present invention relates to vehicle body side structure that includes inner and outer body panels having removable areas.

2. Background Information

The tools used in the manufacture of vehicle parts are typically very costly. For any specific model vehicle, variations in body styles require separate sets of manufacturing tools, such as dies, for each variation in body style. For example, some vehicles can be manufactured in one variation with a side window and in another variation without a side window. These two variations require separate sets of dies, one set of dies to produce inner and outer side panels with a side window and one set of dies to produce inner and outer side panels without a side window.

SUMMARY

One object of the invention is to reduce manufacture costs of a vehicle.

In view of the state of the known technology, one aspect has a vehicle body side structure that includes an outer side panel and an inner side panel. The outer side panel has an outer window area and a window sash formed adjacent to and surrounding the outer window area. The outer window area includes a removable portion that spans the outer window area. The inner side panel has an inner window area and an attachment flange formed adjacent to and surrounding the inner window area. The attachment flange is rigidly attached to the window sash along a connection area to prevent movement of the inner side panel relative to the outer side panel. The removable portion of the outer window area is located adjacent to the connection area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-5, a vehicle 10 is illustrated in accordance with a first embodiment. The vehicle 10 includes a body side structure 12 that has commonized side panels. The commonized side panels of the body side structure 12 are designed and manufactured such that the same side panels are used in the vehicle 10 regardless of whether or not the vehicle 10 is windowless as in FIG. 1 or provided with window assemblies, as in FIG. 4. More specifically, the side panels of the present invention are used in the configuration of the vehicle 10 shown in FIG. 1 without side windows and in the vehicle 10 shown in FIG. 4 with window assemblies installed, as described in greater detail below.

Figure 2:
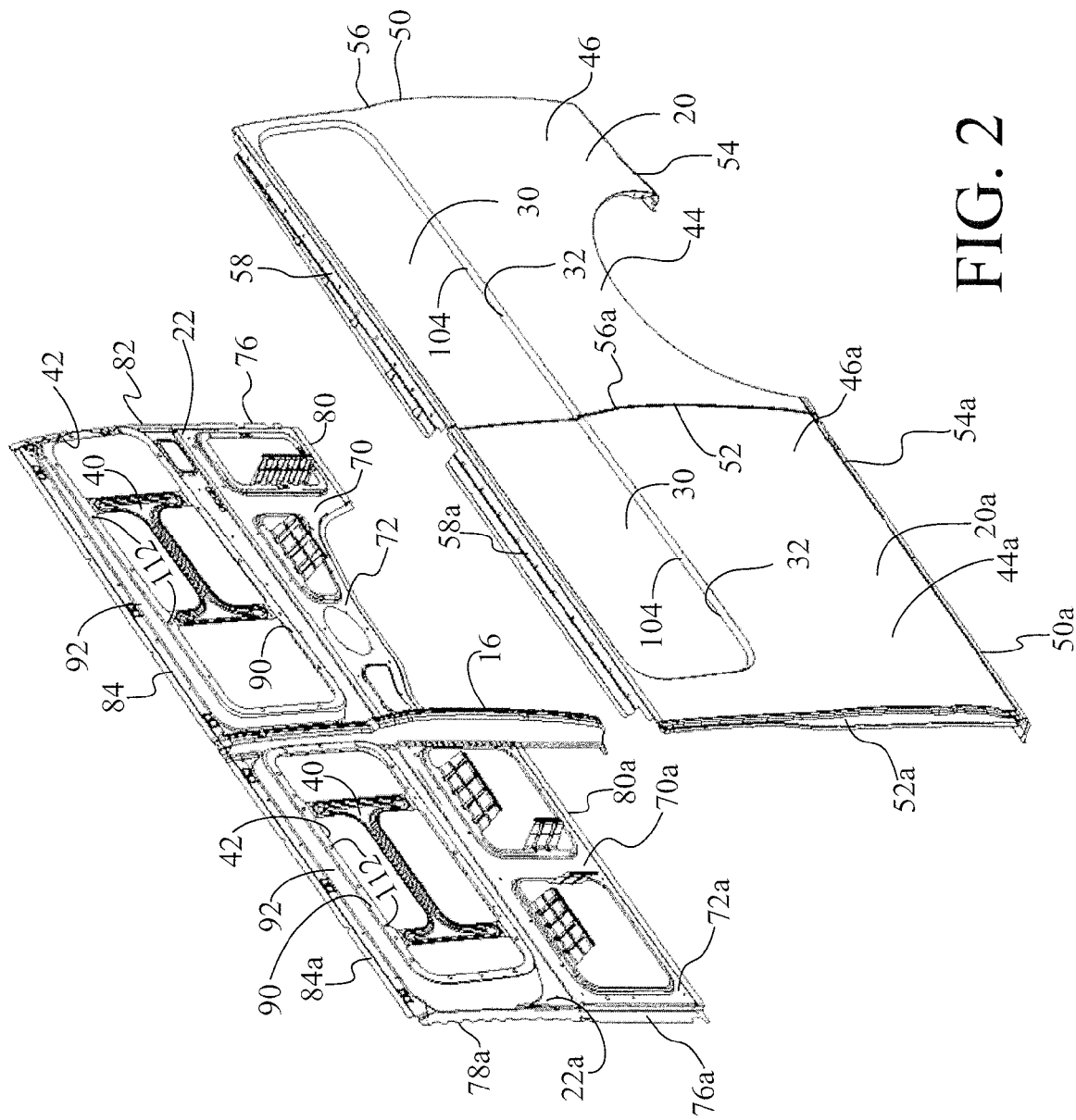
FIG. 2 is a perspective exploded view of a portion of the body side structure of the vehicle, showing the forward outer side panel, the rearward outer side panel, a forward inner side panel, a C-pillar and a rearward inner side panel, the forward and rearward inner side panels each having an inner window area that includes a removable support part that spans across a portion of the inner window area in accordance with the first embodiment.
Figure 3:
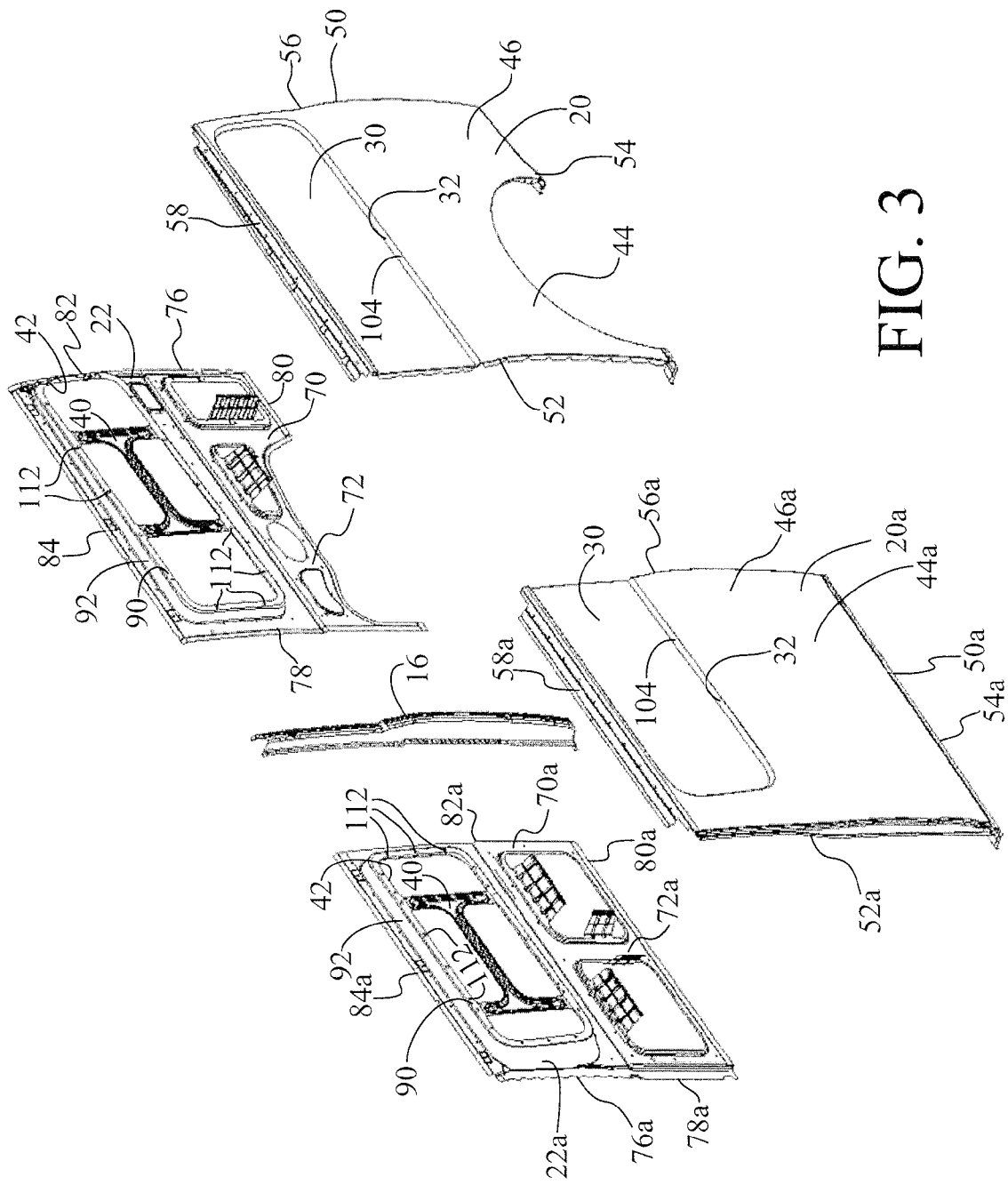
FIG. 3 is another perspective exploded view of the portion of the body side structure of the vehicle depicted in FIG. 2, showing the forward outer side panel, the rearward outer side panel, the forward inner side panel, the C-pillar and the rearward inner side panel separated from one another in accordance with the first embodiment.
Figure 5:
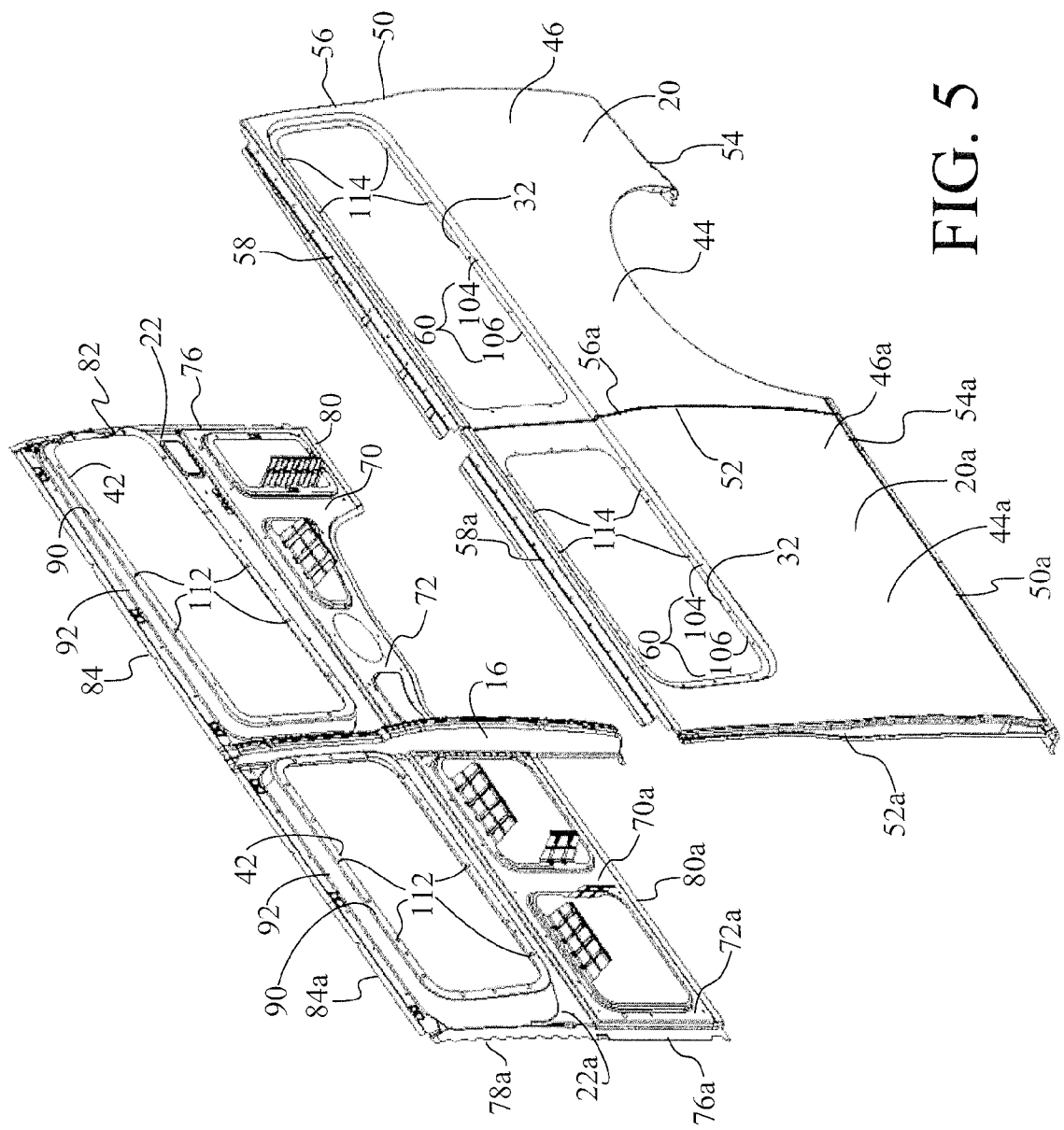
FIG. 5 is another perspective exploded view of the side section of the vehicle, showing the forward and rearward outer side panels with the removable portion removed and the forward and rearward inner side panels with the removable support part removed in accordance with the first embodiment.

The body side structure 12 includes, among other things, a first pillar structure 14 (best shown in FIG. 11), a second pillar structure 16 (shown in FIGS. 2, 3, 5 and 8), a third pillar structure 18 (best shown in FIG. 9), a rear body panel 19, a rear outer side panel 20, a forward outer side panel 20*a*, a rearward inner side panel 22 (best shown in FIGS. 2, 3, 5 and 6) and a forward inner side panel 22*a* (best shown in FIGS. 2, 3 and 5).

The description of the present invention below, relates to an inner side panel and an outer side panel such as the rearward outer side panel 20 and the rearward inner side panel 22 (FIGS. 2, 3 and 5). The rearward outer side panel 20 and the rearward inner side panel 22 are dimensioned and manufactured such that they can be used in a windowless arrangement or with a window assembly, as described below.

Figure 12:
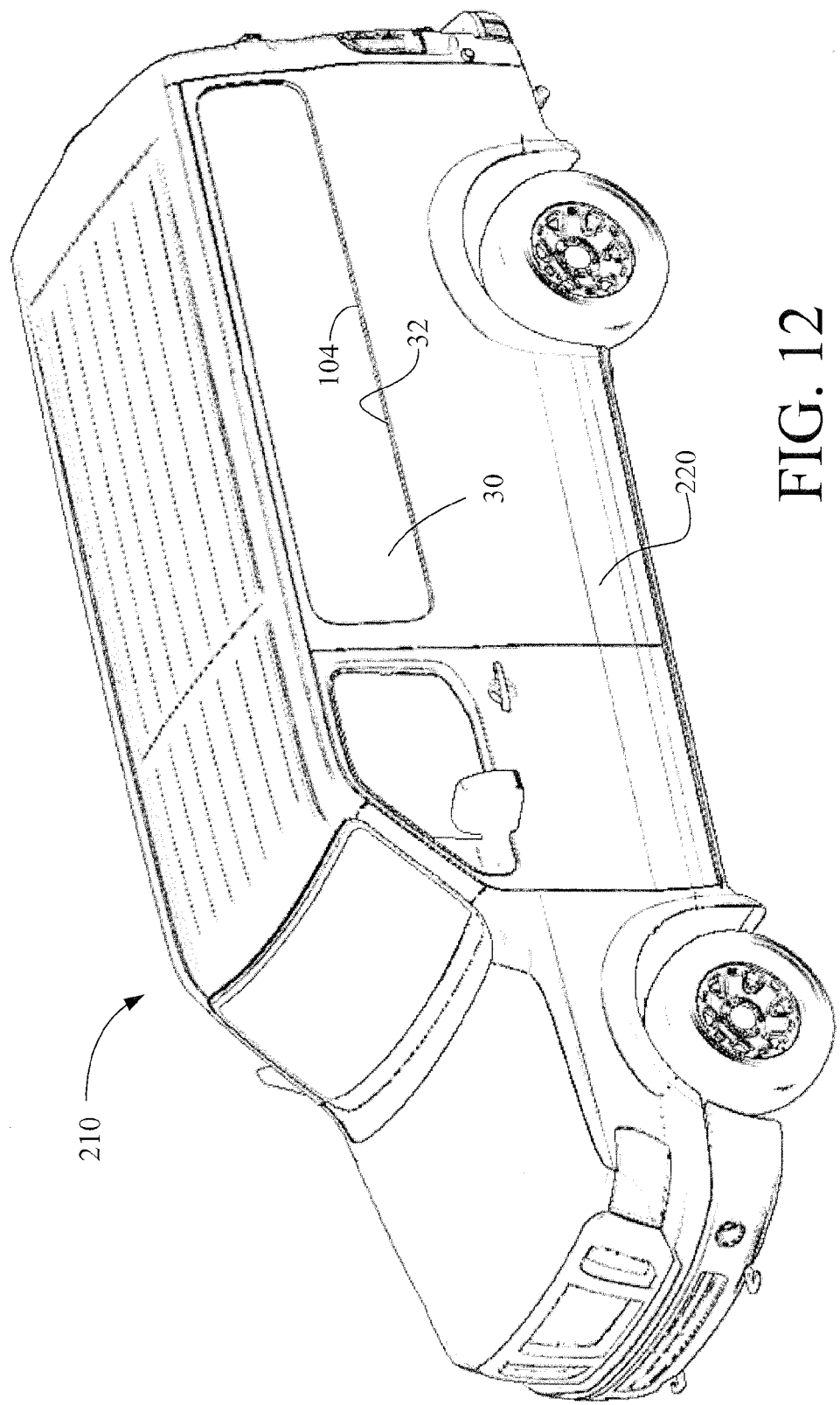
FIG. 12 is a perspective view of a vehicle with a body side structure showing a single outer side panel that includes an outer window area with a removable portion that spans the outer window area concealing a corresponding inner side panel in accordance with a second embodiment.

It should be understood from the drawings and the description herein that the rearward outer side panel 20 and the rearward inner side panel 22 can be used in a vehicle with only one outer side panel and one inner side panel, such as shown in FIG. 12 (a second embodiment). Alternatively, the rearward outer side panel 20 and the rearward inner side panel 22 can be used in a vehicle with a second pair of outer and inner side panels, such as the forward outer side panel 20*a* and the forward inner side panel 22*a* (FIGS. 2, 3 and 5). The description below is mainly directed to the rearward outer side panel 20 and the rearward inner side panel 22. The forward outer side panel 20*a* and the forward inner side panel 22*a* differ only slightly from the rearward outer side panel 20 and the rearward inner side panel 22. However these differences have no relation to the commonized windowless arrangement and window assembly arrangement applications of the rearward outer side panel 20 and the rearward inner side panel 22 and/or the forward outer side panel 20*a* and the forward inner side panel 22*a*.

Therefore, description of the forward outer side panel 20*a* and the forward inner side panel 22*a* will be limited to those features that differ from the features of the rearward outer side panel 20 and the rearward inner side panel 22.

First, a description is provided for a variety of features of the body side structure 12 related to the rearward outer side panel 20 and the rearward inner side panel 22.

Figure 1:
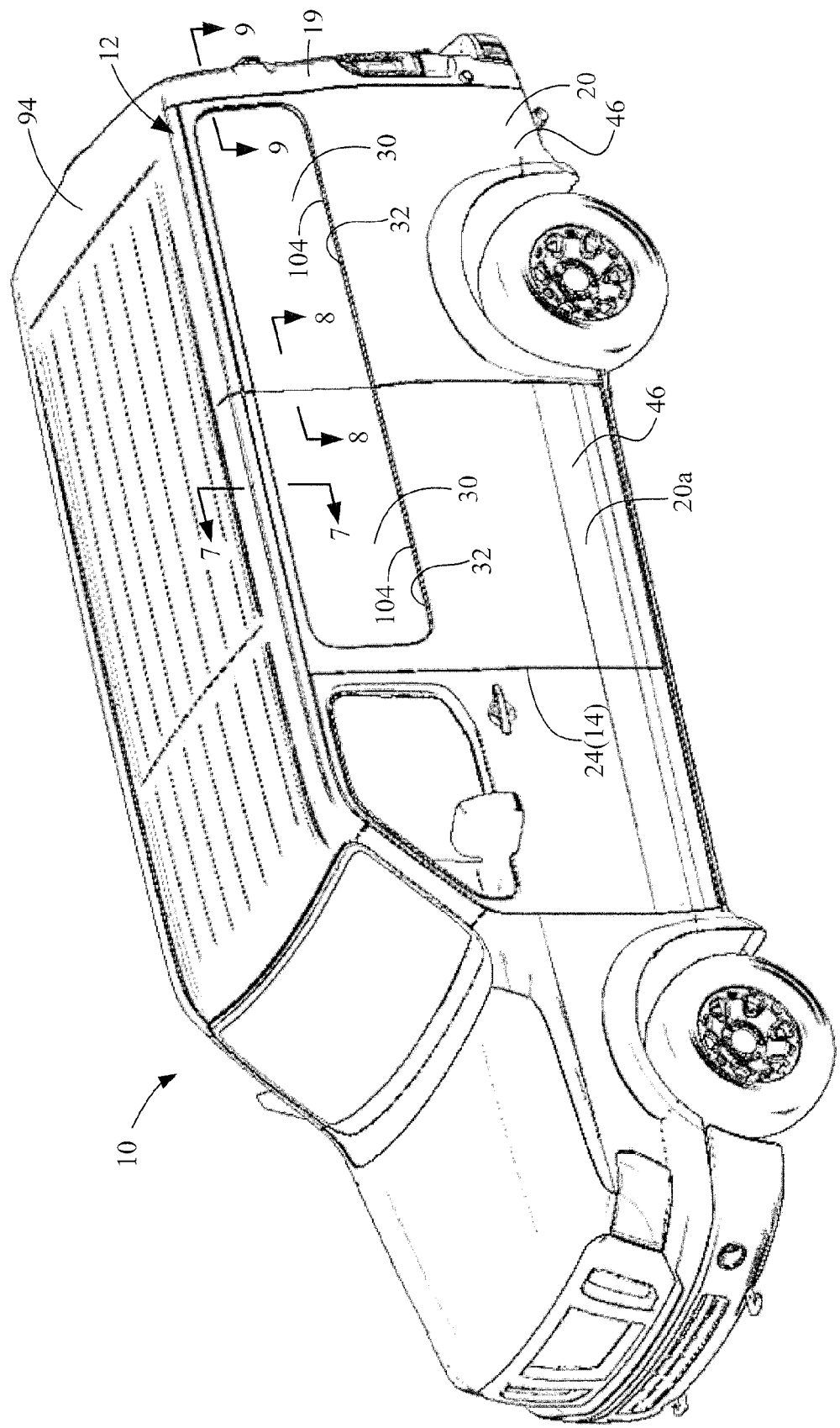
FIG. 1 is a perspective view of a vehicle with a body side structure showing a forward outer side panel and a rearward outer side panel that each include an outer window area with a removable portion that spans the outer window area, the forward and rearward outer side panels concealing corresponding inner side panels in accordance with a first embodiment.
Figure 4:
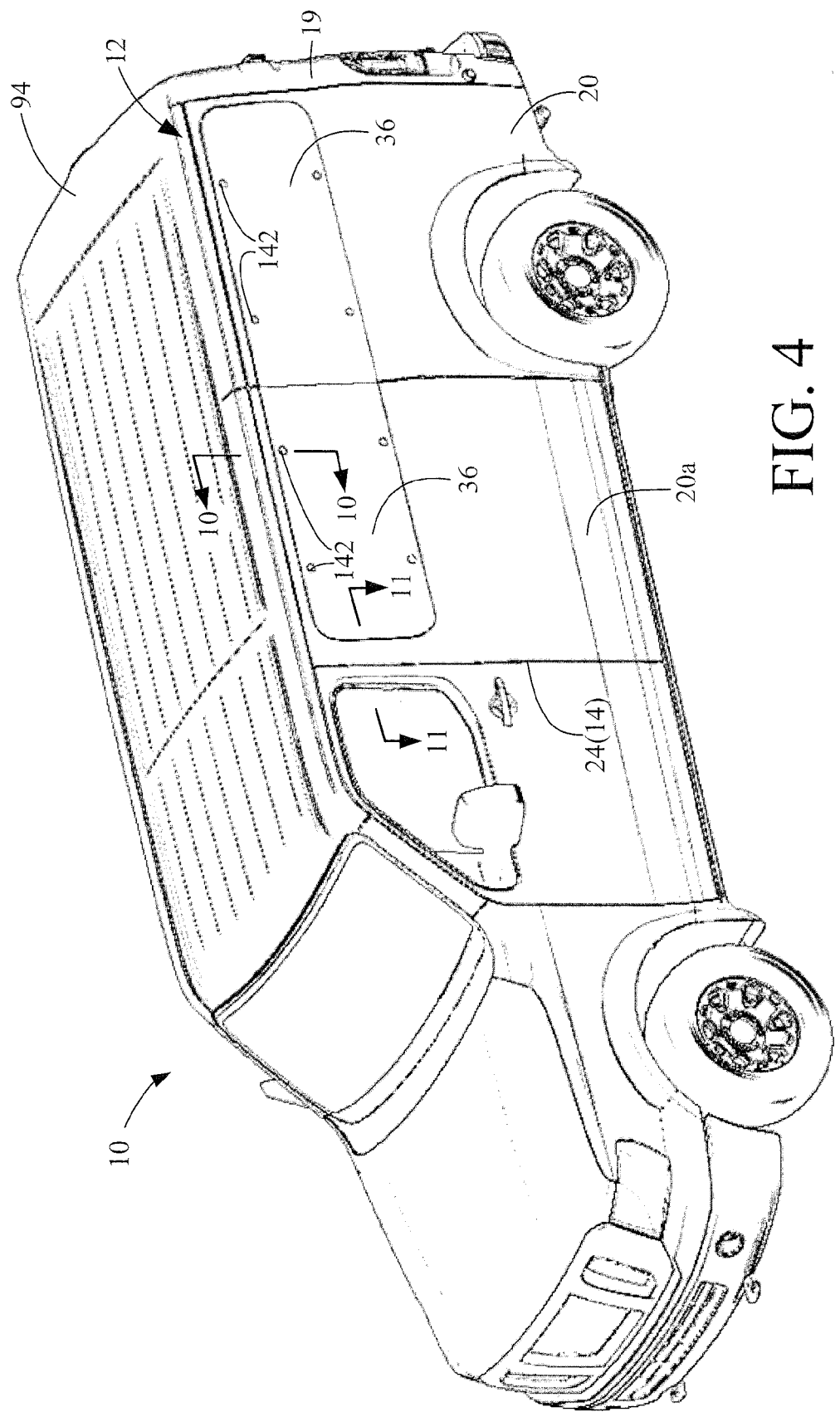
FIG. 4 is another perspective view of the portion of the body side structure of the vehicle showing the forward and rearward outer side panels with the removable portions removed from the outer window areas, and windows installed to the outer window areas in accordance with the first embodiment.
Figure 11:
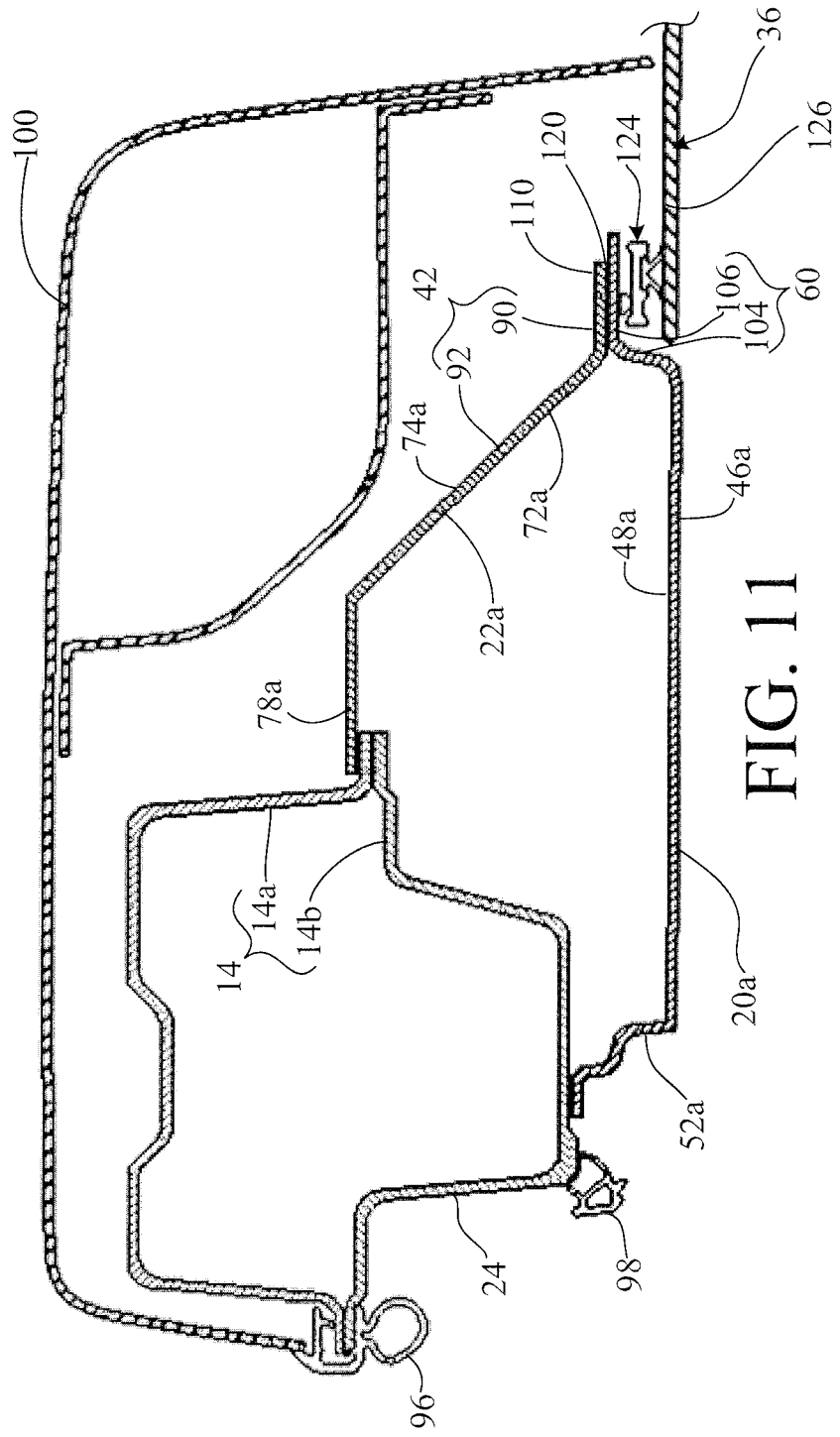
FIG. 11 is another cross-section of a forward section of the body side structure taken along the line 11-11 in FIG. 4, showing portions of the forward outer side panel, the forward side inner panel, a B-pillar and the window assembly in accordance with the first embodiment.

In the depicted embodiment, the first pillar structure 14 (FIG. 11) is a B-pillar that at least partially defines a door opening 24 (FIGS. 1, 4 and 11). The second pillar structure 16 (FIGS. 2, 3, 5 and 8) is a C-pillar and the third pillar structure 18 (FIG. 9) is a D-pillar.

Figure 8:
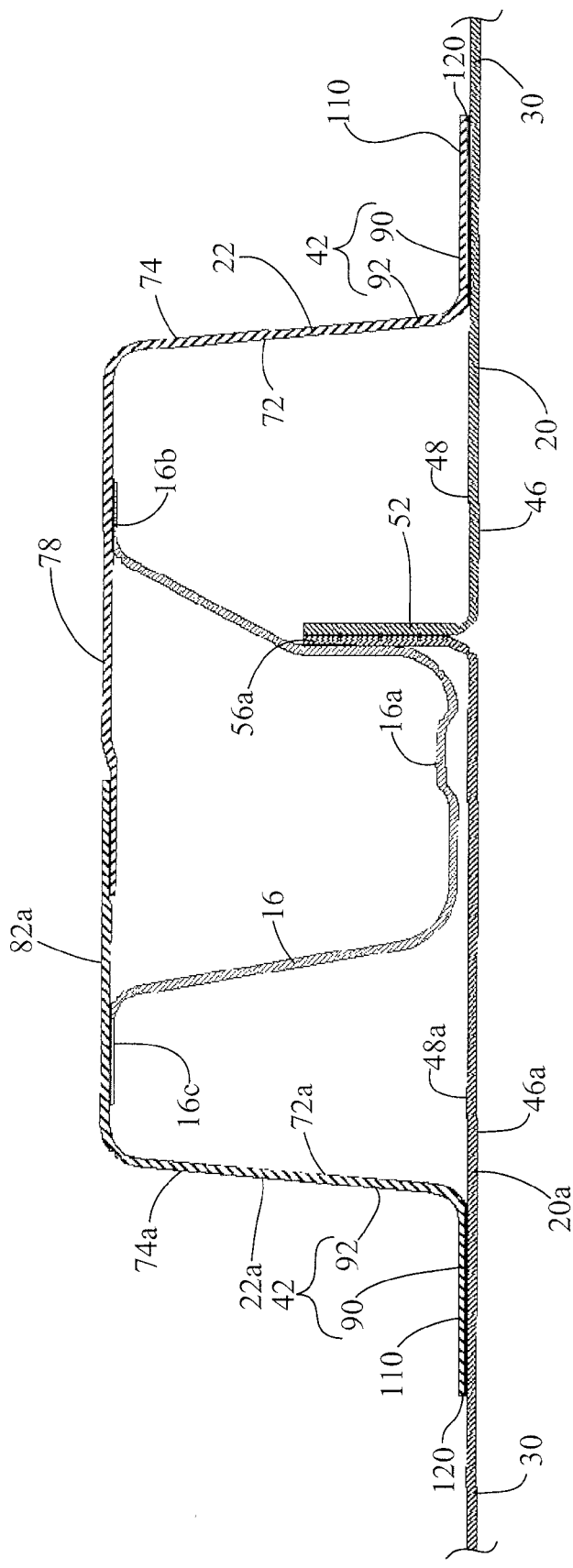
FIG. 8 is a cross-sectional view of a central section of the body side structure taken along the line 8-8 in FIG. 1, showing the structural adhesive that rigidly fixes the window sash of the forward outer side panel and the attachment flange of the forward inner side panel together, and also showing the structural adhesive that rigidly fixes the window sash area of the rearward outer side panel and an attachment flange of the rearward inner side panel together adjacent to the C-pillar in accordance with the first embodiment.

As shown in FIG. 11, the first pillar structure 14 includes at least an inner pillar member 14*a* and an outer pillar member 14*b*. As shown in FIG. 8, the second pillar structure 16 includes a beam-like member that has an undulated appearance or U-shape when in cross-section. The second pillar 16 includes a vertically extending section 16*a* and a pair of flanges 16*b* and 16*c*. The second pillar 16 is attached to the rear outer side panel 20, the forward outer side panel 20*a*, the rearward inner side panel 22 and the forward inner side panel 22*a* by conventional welding techniques, fasteners and/or other mechanical attachment arrangements that facilitate rigid, attachment between the vehicle body panels, as is described in greater detail below.

The third pillar structure 18 is formed near the junction between the rearward outer side panel 20, the rearward inner side panel 22 and the rear body panel 19.

Since the first pillar structure 14, the second pillar structure 16 and the third pillar structure 18 are conventional vehicle body elements, further description is omitted for the sake of brevity.

Figure 9:
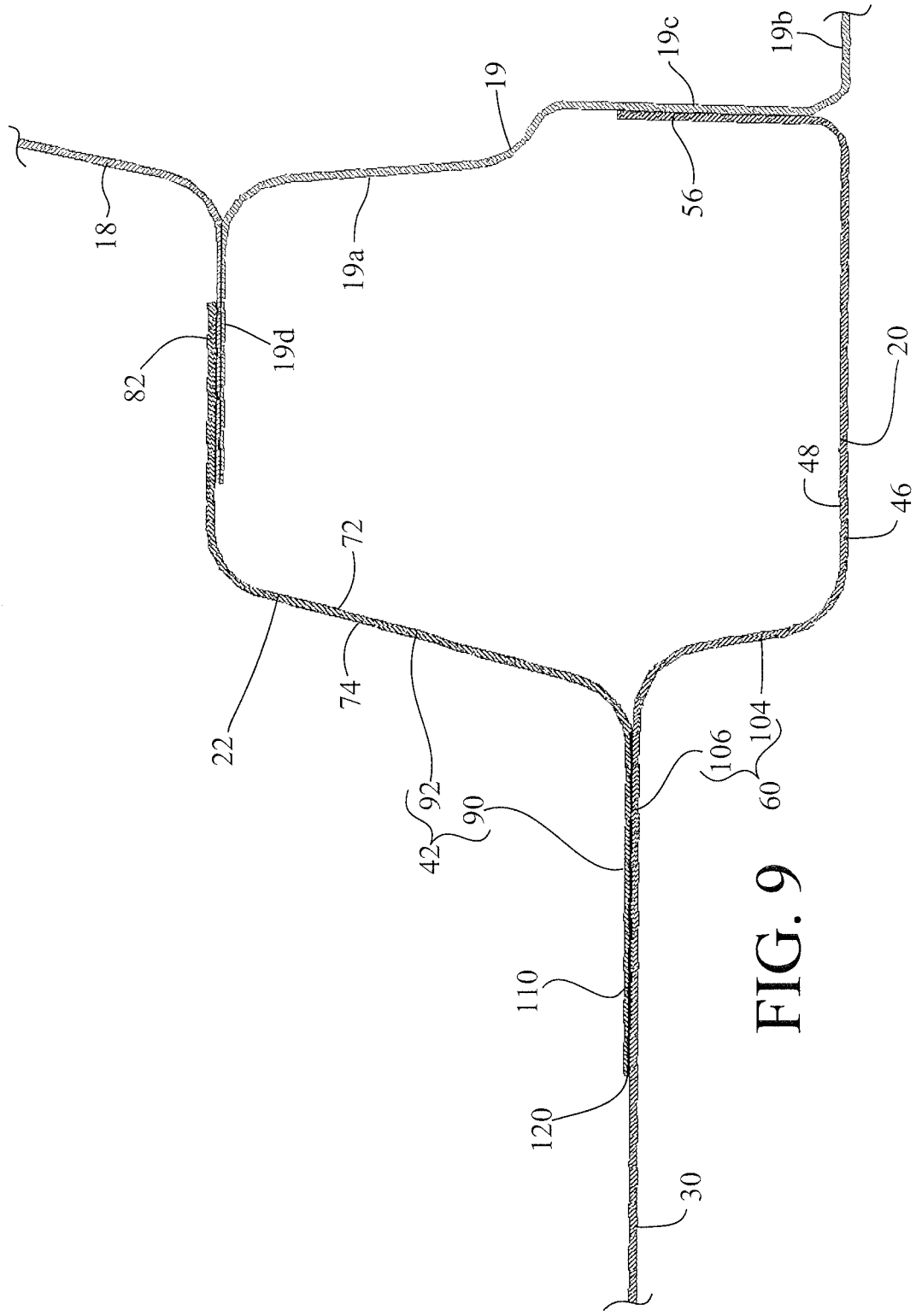
FIG. 9 is another cross-section of a rear section of the body side structure taken along the line 9-9 in FIG. 1 showing the structural adhesive that rigidly fixes the window sash of the rearward outer side panel and the attachment flange of the rearward inner side panel together adjacent to the a D-pillar of the body side structure in accordance with the first embodiment.

As indicated in FIGS. 1, 4 and 9, the rear body panel 19 wraps around the rear corner of the body side structure 12 (and the third pillar structure 18). It should be understood from the drawings and the description herein that the rear body panel 19 can be configured such that the rear body panel 19 serves as a part of the third pillar structure 18.

As best shown in FIG. 9, the rear body panel 19 includes a first surface 19*a*, a second surface 19*b*, a first flange portion 19*c* and a second flange portion 19*d*. The second flange portion 19*d* is welded or otherwise rigidly fixed to a portion of the third pillar structure 18. More specifically, the second surface 19*b* of the rear body panel 19 at the second flange portion 19*d* is rigidly fixed to the third pillar structure 18. Further description of the rear body panel 19 is provided below, after a description of the rearward outer side panel 20 and the rearward inner side panel 22.

As is best shown in FIGS. 2, 3 and 5, the rearward outer side panel 20, the forward outer side panel 20*a*, the rearward inner side panel 22 and the forward inner side panel 22*a* are dimensioned and configured to be used in the vehicle 10 in a windowless arrangement (FIG. 1) and with a window assembly (FIG. 4). More specifically, the rearward and forward outer side panels 20 and 20*a* are each designed and manufactured to include respective removable portions 30 (FIGS. 1, 2 and 3) that span corresponding outer window areas 32. In other words, the rearward outer side panel 20 has a removable portion 30 and the forward outer side panel 20*a* has another removable portion 30.

Figure 6:
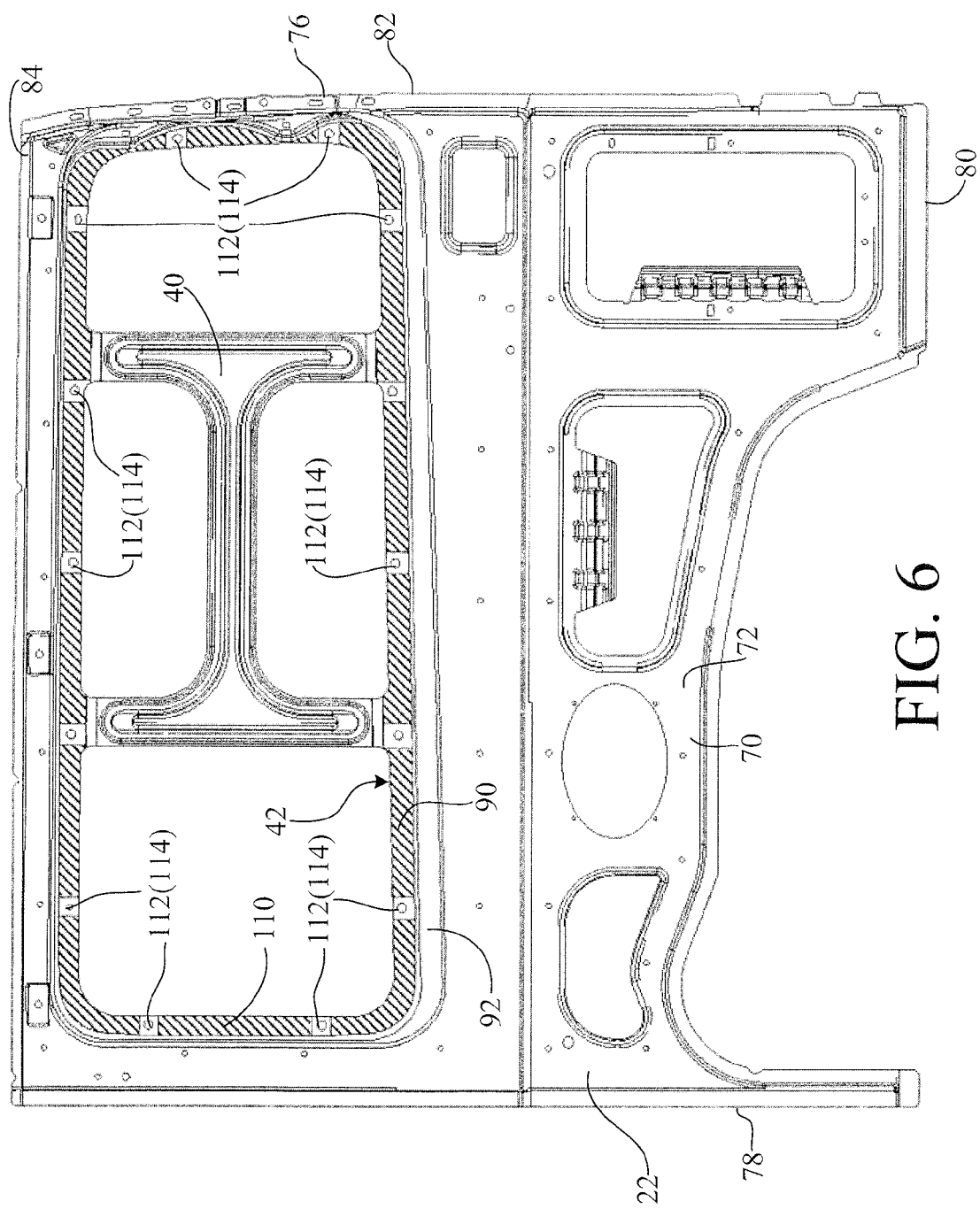
FIG. 6 is a side elevational view of the outer surface of the rearward inner side panel showing the removable support part in accordance with the first embodiment.

The inclusion of the removable portions 30 provides the rearward and forward outer side panels 20 and 20*a* with a complete, uninterrupted outer surface that is windowless. However, if one or both of the removable portions 30 is removed from respective ones of the rearward and forward outer side panels 20 and 20*a*, one or both of the outer window areas 32 becomes a window opening, as shown in FIGS. 4, 5 and 6. A window assembly 36 can be installed to each of the forward and rearward outer side panels 20*a* and 20 covering the outer window areas 32, as indicated in FIG. 4 and described in greater detail below.

Similarly, the rearward and forward inner side panels 22 and 22*a* are designed and manufactured to include corresponding removable support parts 40 (FIGS. 2 and 3) that span corresponding portions of inner window areas 42. The inner window areas 42 coincide in overall shape and dimension with the outer window areas 32, as is described in greater detail below. The removable support parts 40 provide the rearward inner side panel 22 with reinforcement when the forward and rearward outer side panels 20a and 20, and the forward and rearward inner side panels 22a and 22 are windowless. However, if the removable support parts 40 of the forward and rearward inner side panels 22a and 22 are removed, the inner window areas 42 (FIG. 5) are fully open and correspond approximately in shape and dimensions to the outer window areas 32 of the forward and rearward outer side panels 20a and 20, as described in greater detail below.

The rearward outer side panel 20 and the forward outer side panel 20a have slightly different dimensions from one another. For example, the rearward outer side panel 20 includes a contoured portion that at least partially forms a wheel well, as shown in FIGS. 1-5. The forward outer side panel 20a does not have such a contoured portion. However, the outer window areas 32 and the removable portions 30 of each of the rearward outer side panel 20 and the forward outer side panel 20a are identical. Therefore the description below of the outer window area 32 and the removable portion 30 applies equally to both the rearward outer side panel 20 and the forward outer side panel 20a. Further, only those features of the rearward outer side panel 20 that differ from features of the forward outer side panel 20a are described hereinbelow for the sake of brevity.

Similarly, the rearward inner side panel 22 and the forward inner side panel 22a and have slightly different dimensions from one another. Further, like the rearward outer side panel 20, the rearward inner side panel 22 includes a contoured portion that at least partially forms a wheel well, as shown in FIGS. 2, 3 and 5. However, the inner window areas 42 and the removable support parts 40 of each of the rearward inner side panel 22 and the forward inner side panel 22a are identical. Therefore the description below of the inner window area 42 and the removable support part 40 applies equally to both the rearward inner side panel 22 and the forward inner side panel 22a.

A description of various features of the rearward outer side panel 20, the forward outer side panel 20a, the rearward inner side panel 22 and the forward inner side panel 22a is now provided with specific reference to FIGS. 2, 3 and 5.

The rearward outer side panels 20 includes a main body 44, an outer surface 46, an inner surface 48 (FIGS. 8 and 9) and an outer periphery 50 that includes a front section 52, a lower section 54, a rearward section 56, an upper section 58 and the removable portion 30 that fills the outer window area 32 (with the removable portions 30 in place).

The forward outer side panels 20a includes a main body 44a, an outer surface 46a (FIGS. 7 and 8), an inner surface 48a and an outer periphery 50a that includes a front section 52a, a lower section 54a, a rearward section 56a, an upper section 58a and the removable portion 30 that fills the outer window area 32 (with the removable portions 30 in place).

The outer window area 32 of both the rearward outer side panel 20 and the forward outer side panel 20a includes a window sash 60 that is formed adjacent to and surrounding the outer window area 32. The outer window area 32 becomes a window opening with the removable portion 30 removed (FIGS. 3 and 4). With the removable portion 30 included with the rearward outer side panel 20, the removable portion 30 spans and completely closes the outer window area 32. More specifically, the removable portion 30 completely fills and obscures the outer window area 32.

The rearward inner side panel 22 includes a main body 70, an outer surface 72, an inner surface 74 and an outer periphery 76 that includes a front section 78, a lower section 80, a rearward section 82 and an upper section 84. The rearward inner side panel 22 also includes the removable support part 40 that that spans the inner window area 42. The inner window area 42 further includes an attachment flange 90 and an offset section 92 that are formed adjacent to and surrounding the inner window area 42. With the removable support part 40 included with the rearward inner side panel 22, the removable support part 40 partially spans the inner window area 42. With the removable support part 40 removed, the outer window area 42 becomes a window opening (FIGS. 4 and 5).

The forward inner side panel 22a includes a main body 70a, an outer surface 72a, an inner surface 74a and an outer periphery 76a that includes a front section 78a, a lower section 80a, a rearward section 82a and an upper section 84a. The forward inner side panel 22a also includes the removable support part 40 that that spans the inner window area 42.

Figure 7:
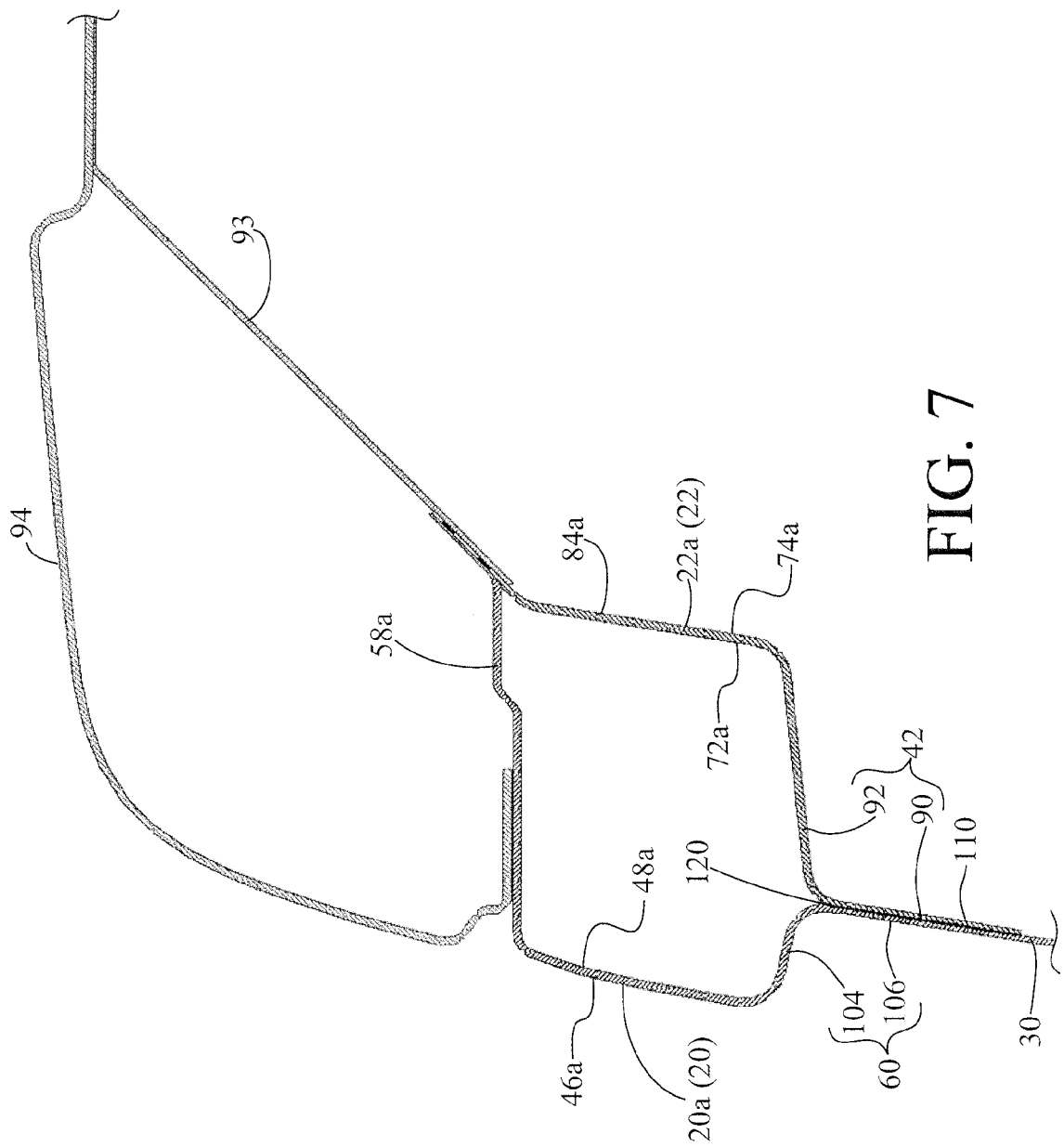
FIG. 7 is a cross-sectional view of an upper section of the body side structure taken along the line 7-7 in FIG. 1, showing a structural adhesive that rigidly fixes a window sash of the forward outer side panel and an attachment flange of the forward inner side panel together, adjacent to a roof panel of the vehicle in accordance with the first embodiment.

As best shown in FIG. 7, the upper section 58a of the forward outer side panel 20a and the upper section 84a of the forward inner side panel 22a are welded, bolted or otherwise rigidly fixed to one another. Further, the upper section 58a of the forward outer side panel 20a and the upper section 84a of the forward inner side panel 22a are welded, bolted or otherwise rigidly fixed to an inner panel of a roof rail 93. The roof rail 93 is a conventional side structural portion that is at least partially formed by an outboard section of a roof panel 94. As shown in FIG. 7, the roof panel 94 is welded, bolted or otherwise rigidly fixed to the upper section 58a of the forward outer side panel 20a.

As best shown in FIG. 8, the front section 52 of the outer periphery 50 of the rearward outer side panel 20 includes flange that is welded, bolted or otherwise rigidly fixed to the rearward section 56a of the forward outer side panel 20a. The flange 16b of the second pillar structure 16 is welded, bolted or otherwise rigidly fixed to the front section 78 of the rearward inner side panel 22. The flange 16c of the second pillar structure 16 is welded, bolted or otherwise rigidly fixed to the rearward section 82a of the forward inner side panel 22a. Further, the front section 78 of the rearward inner side panel 22 overlaps with the rearward section 82a of the forward inner side panel 22a and is welded, bolted or otherwise rigidly fixed to the rearward section 82a of the forward inner side panel 22a.

Hence, the rearward outer side panel 20, the rearward inner side panel 22 and the second pillar structure 16 form a closed box section when viewed in cross-section in FIG. 8. Further, the forward outer side panel 20a, the forward inner side panel 22a and the second pillar structure 16 form a closed box section when viewed in cross-section in FIG. 8.

As best shown in FIG. 9, the rearward section 56 of the rearward outer side panel 20 is welded, bolted or otherwise rigidly fixed to the first flange portion 19c of the rear body panel 19. Further, the rearward section 82 of the rearward inner side panel 22 is welded, bolted or otherwise rigidly fixed to the second flange portion 19d of the rear body panel 19. Further, the third pillar structure 18, the second flange portion 19d of the rear body panel 19 and the rearward section 82 of the rearward inner side panel 22 are all welded together. Hence, the rearward section 82 of the rearward inner side panel 22 is rigidly connected to the second surface 19b of the rear body panel 19.

Consequently, the rear body panel 19 (which is a part of the third pillar structure 18) is connected at its first surface 19a (a first side) to the rearward outer side panel 20 and is connected at its second surface 19b (a second side) to the rearward inner side panel 22 such that the connections between the rearward outer side panel 20, the rearward inner side panel 22 and the rear body panel 19 (the pillar portion) form a closed box section when viewed in cross-section in FIG. 9.

As shown in FIG. 11, the front section 52a of the forward outer side panel 20a is welded, bolted or otherwise rigidly fixed to the outer pillar member 14b of the first pillar structure 14. The front section 78a of the forward inner side panel 22a is welded, bolted or otherwise rigidly fixed to the inner pillar member 14a of the first pillar structure 14. Hence, the forward outer side panel 20a, the forward inner side panel 22a and the first pillar structure 14 form a closed box section when viewed in cross-section in FIG. 11. Further, the forward outer side panel 20a and the forward inner side panel 22a are rigidly fixed to and extend between the first pillar structure 14 and the second pillar structure 16. Similarly, the rearward outer side panel 20 and the rearward inner side panel 22 are rigidly fixed to and extend between the second pillar structure 16 and the third pillar structure 18.

As is also shown in FIG. 11, the outer pillar member 14b of the first pillar structure 14 supports sealing members 96 and 98 that surround the door opening 24. Further, the forward inner side panel 22a and the first pillar structure 14 are at least partially covered by trim element 100.

As is indicated in FIGS. 1 and 4, the lower sections 54 and 54a of the rearward and forward outer side panels 20 and 20a are fixed to lower structural elements (not shown) of the body side structure 12 in a conventional manner.

As is best shown in FIGS. 5, 7 and 9-11, the window sash 60 surrounds and encircles the outer window area 32 (and the removable portion 30, if the removable portion 30 is present within the outer window area 32). The window sash 60 includes a recessed portion 104 and a flange portion 106. Specifically, the flange portion 106 lies in a plane that is offset or spaced apart inboard from the outer surface 46 of the rearward outer side panel 20. The recessed portion 104 of the window sash 60 is a contoured section of the rearward outer side panel 20 that bridges the offset between flange portion 106 of the window sash 60 and the outer surface 46 of the rearward outer side panel 20.

As is indicated in FIGS. 6-11, the attachment flange 90 of the rearward inner side panel 22 is rigidly attached to flange portion 106 of the window sash 60 along a connection area 110 to prevent movement of the rearward inner side panel 22 relative to the rearward outer side panel 20. The connection area 110 is indicated in FIG. 6 with shading. Further, the connection area 110 can include a plurality of small gaps for window assembly and attachment apertures 112, as is described in greater detail below. However, it should be understood from the drawings and the description herein that the connection area 110 can be formed in a continuous and uninterrupted manner.

As can be seen in FIG. 6-11, the attachment flange 90 is attached to flange portion 106 of the window sash 60. Further, the connection area 110 extends around substantially the entire perimeter of the window sash 60 and the attachment flange 90.

The attachment apertures 112 are formed in the attachment flange 90 of the rearward inner side panel 22 whether or not a side window is included in the vehicle 10. As shown in FIG. 5, attachment apertures 114 are formed in the flange portion 106 of the window sash 60 of the rearward outer side panel 20. However, attachment apertures 114 are only added to the flange portion 106 of the rearward outer side panel 20 only when the removable portion 30 is removed from the rearward outer side panel 20. The attachment apertures 112 align with the attachment apertures 114, as indicated in FIG. 10.

The connection area 110 is basically defined by a structural adhesive 120, as is best shown in FIGS. 7-11. For example, the attachment flange 90 is rigidly attached to the flange portion 106 of the window sash 60 with the structural adhesive material 120, that attaches substantially all of the attachment flange 90 to substantially all of the flange portion 106 of the window sash 60. As mentioned above, the application of the structural adhesive material 120 is only interrupted by gaps corresponding to the location of the attachment apertures 112 and 114, shown in FIG. 6. The structural adhesive material 120 is preferably a high strength adhesive that has a strength that is approximately equivalent to welding of the attachment flange 90 to the flange portion 106. Additionally, when the removable portion 30 and the removable support part 40 remain with the rearward outer side panel 20 and the rearward inner side panel 22, the structural adhesive material 120 rigidly fixes the removable portion 30 to the removable support part 40.

Figure 10:
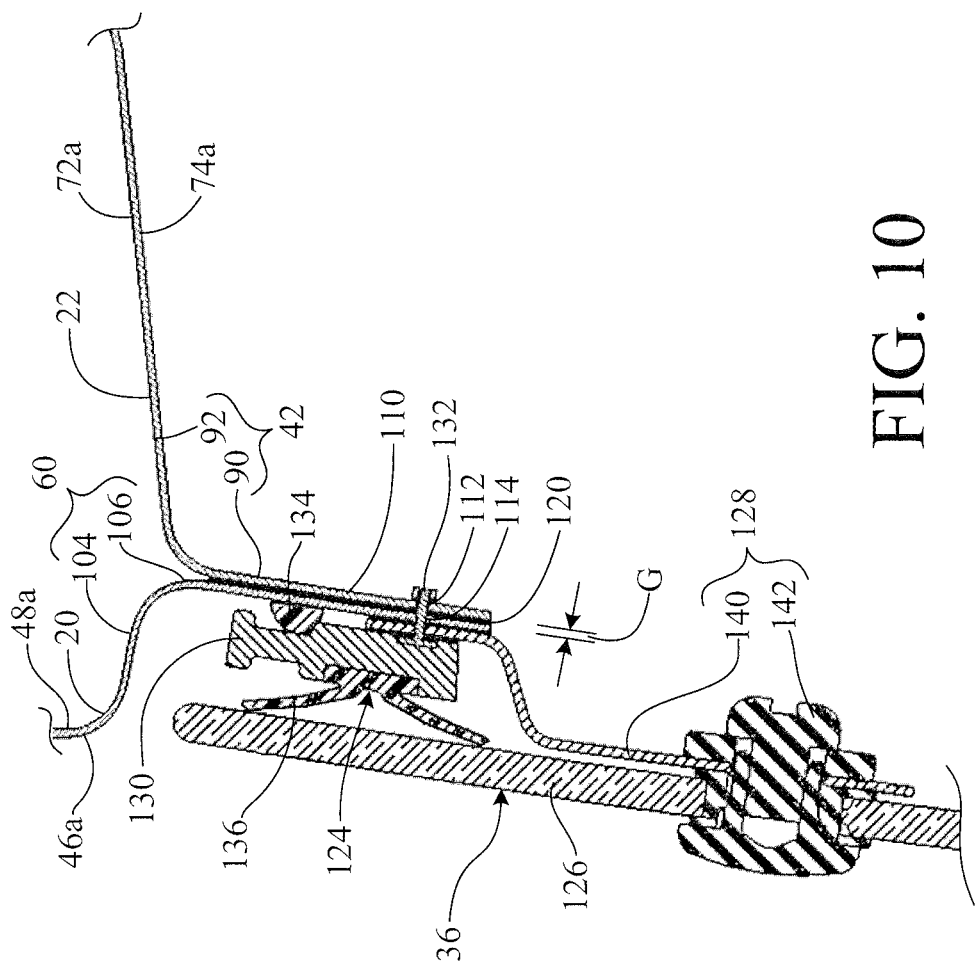
FIG. 10 is another cross-section of the section of the body side structure taken along the line 10-10 in FIG. 4, showing the structural adhesive that rigidly fixes the window sash of the forward outer side panel and the attachment flange of the side inner panel together, with the removable portion and the removable support part removed and a window assembly installed to the window sash and attachment flange in accordance with the first embodiment.

As is best shown in FIG. 10, the attachment flange 90 of the rearward inner side panel 22 is spaced apart from the flange portion 106 of the window sash 60 by a gap G that is between 0.02 mm and 1.0 mm when the attachment flange 90 is attached to the window sash 60. In one embodiment the gap G is 0.5 mm. The structural adhesive material 120 fills the gap G between the attachment flange 90 and flange portion 106 of the window sash 60. More specifically, the structural adhesive material 120 is encapsulated between the attachment flange 90 and the flange portion 106 of the window sash 60. A gap (not shown) of approximately 4 mm is provided between the removable portion 30 and the removable support part 40 and is filled with the structural adhesive material 120.

The configuration of the rearward outer side panel 20 and the rearward inner side panel 22 are a pair of structural elements for the vehicle 10 that provide a commonized panel assembly arrangement. More specifically, the rearward outer side panel 20 is manufactured using the same set of dies regardless of whether or not a window is to be included in the vehicle 10. Similarly, the rearward inner side panel 22 is manufactured using the same set of dies regardless of whether or not a window is to be included in the vehicle 10. After manufacturing of the rearward outer side panel 20 and the rearward inner side panel 22 (FIG. 2), if the vehicle 10 is to have a windowless side panel arrangement, the removable portion 30 of the rearward outer side panel 20 is left intact within the outer window area 32, as shown in FIGS. 2 and 3. Similarly, if the vehicle 10 is to have a windowless side panel arrangement, the removable support part 40 is left intact within the inner window area 42, as shown in FIGS. 2 and 3.

Conversely, after manufacturing of the rearward outer side panel 20 and the rearward inner side panel 22 (FIGS. 2 and 3), if the vehicle 10 is to have a side panel arrangement that includes a window, the removable portion 30 of the rearward outer side panel 20 is removed from the outer window area 32, as shown in FIG. 5. Also, the attachment apertures 114 are then formed (stamped or drilled) into the flange portion 106 of the window sash 60 of the rearward outer side panel 20. Similarly, if the vehicle 10 is to have a side panel arrangement that includes a window, the removable support part 40 is removed from the inner window area 42, as shown in FIG. 5. As mentioned above, the attachment apertures 112 in the attachment flange 90 of the rearward inner side panel 22 can be formed with initial manufacturing of the rearward inner side panel 22 or can be formed at the same time as removal of the removable support part 40.

The removable portion 30 can be removed from the outer window area 32 prior to assembly of the body side structure 12 and the removable support part 40 can be removed from the inner window area 42 prior to assembly of the body side structure 12. The removable portion 30 and the removable support part 40 can be removed by a robotic cutting tool, a separate set of dies or manually on the assembly line with simple cutting tools (not shown). The removable portion 30 and the removable support part 40 can alternatively be removed from the inner window area 42 after assembly of the body side structure 12. The removable portion 30 and the removable support part 40 can be removed by a robotic punching tool on the assembly line, a robotic cutting tool on the assembly line or manually on the assembly line with manually operated cutting tools (not shown).

Consequently, the vehicle 10 can easily be assembled using the rearward outer side panel 20 and the rearward inner side panel 22 and be assembled without a side window, as in FIG. 1 or be assembled with a side window, as in FIG. 3.

When the vehicle 10 is to include a side window (FIG. 4), the removable portion 30 is removed from the rearward outer side panel 20 and the removable support part 40 is removed from the rearward inner side panel 22. Next, the window assembly 36 (FIG. 4) is installed to the window sash 60 of the rearward outer side panel 20, as described below.

As best shown in FIG. 10, the window assembly 36 includes a seal assembly 124, a window glass 126 and a bracket assembly 128. The seal assembly 124 includes a ring member 130, attachment fasteners 132, an inner seal element 134 and an outer seal element 136. The ring member 130 is dimensioned to fit along the window sash 60 of the rearward outer side panel 20, encircling the outer window area 32. The ring member 130 is preferably made of a material that retains its overall shape, but has a predetermined amount of flexibility. In other words, the ring member 130 has sufficient rigidity to compress the inner seal element 134 against the flange portion 106 of the window sash 60, but can have a small degree of flexibility to conform to any curvature that may be provided in the overall design of the rearward outer side panel 20.

The attachment fasteners 132 extend from the ring member 130 and are installed to the attachment apertures 112 and attachment apertures 114. The inner seal element 134 is flexible and compressible in order to establish a water tight seal between the ring member 130 and the flange portion 106 of the window sash 60. The outer seal element 136 includes a pair of projecting portions (shown in FIG. 10) that are flexible and resilient in order to provide a reliable seal between the window glass 126 and the ring member 130.

The window glass 126 is installed via the bracket assembly 128 to cover the outer window area 32 and overlap with the window sash 60, as indicated in FIGS. 10 and 11.

The bracket assembly 128 includes a bracket 140 and fasteners 142. The fasteners 142 extend through apertures in the bracket 140 and the window glass 126, as shown in FIG. 10. The fasteners 142 secure the window glass 126 to the bracket 140. The brackets 130 are secured to the rearward outer side panel 20 and the rearward inner side panel 22 by the attachment fasteners 142, as shown in FIG. 10.

A description is now provided of a method of assembling the body side structure 12. The description of the method below is directed to the rearward outer side panel 20 and the rearward inner side panel 22, but equally applies to the forward outer side panel 20a and the forward inner side panel 22a.

As shown in FIG. 2, the rearward outer side panel 20 is manufactured having the outer window area 32, the main body 44 and the window sash 60 formed adjacent to and surrounding the outer window area 32. The outer window area 32 includes the removable portion 30 that spans the outer window area 32. The rearward outer side panel 20 is manufactured using, for example, sheet metal shaping dies that are dimensioned and shaped to stamp out the rearward outer side panel 20 from sheet metal or other suitable vehicle side panel forming materials.

The rearward inner side panel 22 is also manufactured having the inner window area 42, the main body 70, the offset section 92 and the attachment flange 90 formed adjacent to and surrounding the inner window area 42. The inner window area 42 of the rearward inner side panel 22 includes the removable support part 40, as shown in FIG. 2.

Thereafter, the structural adhesive material 120 is applied to one of the flange portion 106 of the sash 60 of the rearward outer side panel 20 and the attachment flange 92 of the rearward inner side panel 22. Next, the outer window area 32 of the rearward outer side panel 20 and the inner window area 42 of the rearward inner side panel 22 are aligned and attached to one another by the structural adhesive material 120. Specifically, the flange portion 106 attaches to the attachment flange 92.

The rearward outer side panel 20 and the rearward inner side panel 22 are then ready for use in a windowless arrangement.

However, it should be understood from the drawings and the description herein that the removable portion 30 can be removed from the rearward outer side panel 20 to form the outer window area 32 (a window opening) and the removable support part 40 can be removed from the inner window area 42 of the rearward inner side panel 22 before or after the application of the structural adhesive material 120. Further, the removable portion 30 and the removable support part 40 can be removed before or after assembly of the body side structure 12.

When the body side structure 12 is assembled and the rearward outer side panel 20 and the rearward inner side panel 22 are attached to one another, the rearward outer side panel 20 and the rearward inner side panel 22 are further attached to one or both of the second and third pillar structures 16 and 18 (for example, the rear body panel 19) to form a closed box section, as shown in FIGS. 8 and 9.

In all of the embodiments described herein, the flange portion 106 of the window sash 60 and the attachment flange 90 of the inner window area 42 are rigidly fixed to one another by the adhesive material 120, regardless of whether or not the window assembly 36 is installed (windowless and windowed arrangements). As a result of the use of the adhesive material 120 in the connection area 110, the side body structure 12 is provided with improved strength and rigidity. The rigid connection provided by the connection area 110 connects the outer and inner side panels in a manner similar to a truss system in that the overall rigidity of both inner and outer side panels is improved and enhanced.

Further, it should be understood from the drawings and the description herein that the overall shape and relative dimensions of the attachment flange 90 and the offset section 92 of the inner side panels allows for an increase in the overall visibility through the inner window area 42. Specifically, the attachment flange 90 and the offset section 92 are configured such that the overall size of the inner window area 42 is maximized compared to prior art configurations.

Second Embodiment

Figure 13:
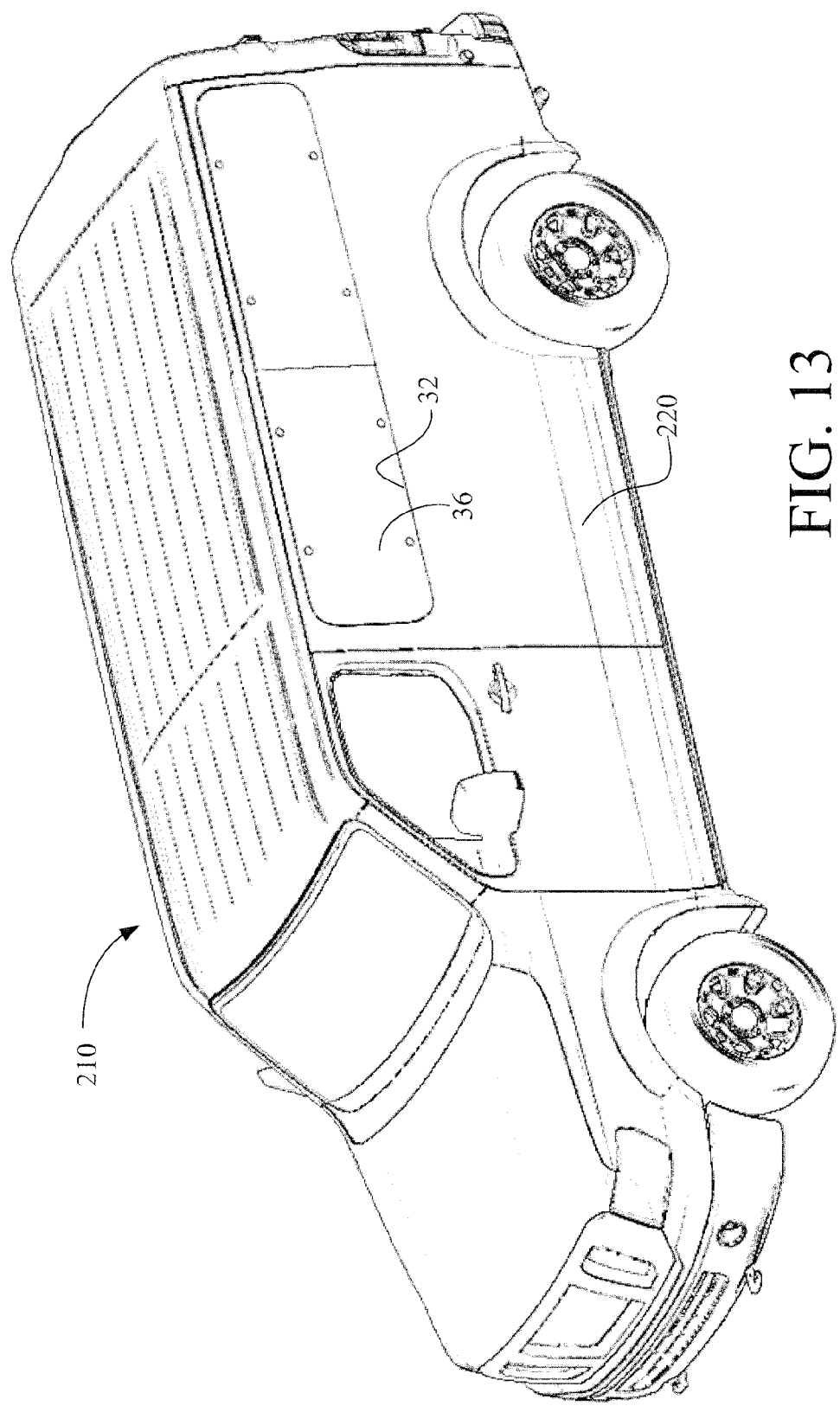
FIG. 13 is another perspective view of the vehicle and the body side structure depicted in FIG. 12, showing the outer side panel with the removable portion removed from the outer window area and a corresponding window assembly attached to the outer side panel in accordance with the second embodiment.

Referring now to FIGS. 12 and 13, a vehicle 210 in accordance with a second embodiment will now be explained. In view of the similarity between the first and second embodiments, the parts of the second embodiment that are identical to the parts of the first embodiment will be given the same reference numerals as the parts of the first embodiment.

Moreover, the descriptions of the parts of the second embodiment that are identical to the parts of the first embodiment may be omitted for the sake of brevity.

In the second embodiment, the vehicle 210 includes at least a first pillar structure and a second pillar structure (not shown) and a single outer side panel 220.

The outer side panel 220 differs from the rearward outer side panel 20 of the first embodiment in that it is dimensioned differently and is the only side panel of the vehicle 210. The outer side panel 220 otherwise has all of the features of the rearward outer side panel 20 of the first embodiment. Specifically, the outer side panel 220 includes the outer window area 32 with the removable portion 30 and the recessed portion 104. The removable portion 30 can be left in the outer window area 32 such that the outer side panel 220 is windowless, as shown in FIG. 12. However, when the removable portion 30 is removed from the window sash 60, the window assembly 36 can be installed to the outer side panel 220, as shown in FIG. 13.

It should be understood from the drawings and the description herein that the outer side panel 220 has a corresponding inner side panel (not shown) that is the same as the rearward inner side panel 22 of the first embodiment.

In the second embodiment, the first outer side panel 220 (and corresponding inner side panel) extend between a first pillar structure (not shown) and a second pillar structure (not shown). The attachments between the outer side panel 220 and the first pillar structure and the second pillar structure of the second embodiments are the same as the attachments of the forward outer side panel 20a to the first pillar structure 14, and the rearward outer side panel 20 to the third pillar structure 18 of the first embodiment. Therefore, further description is omitted for the sake of brevity.

The various components and features of the vehicles 10 and 210, other than the above described features of their respective vehicle body side structures, are conventional components and features that are well known in the art. Since these components and features are well known in the art, these structures will not be discussed or illustrated in detail herein. Rather, it will be apparent to those skilled in the art from this disclosure that the components can be any type of structure and/or programming that can be used to carry out the present invention.

Third Embodiment

Figure 14:
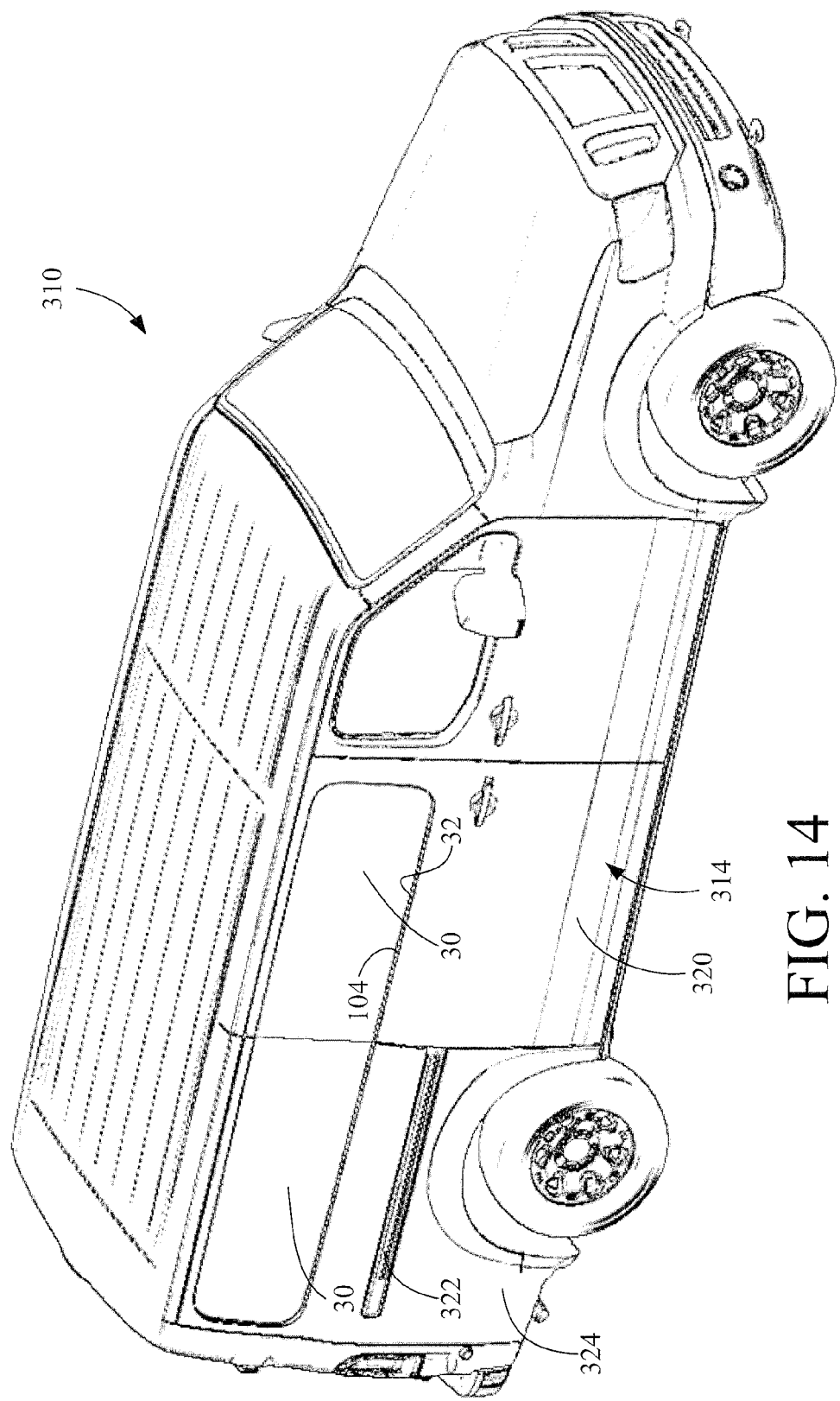
FIG. 14 is a perspective view of a vehicle with a body side structure showing a sliding door that includes an outer side panel that includes an outer window area with a removable portion that spans the outer window area concealing corresponding inner side panel in accordance with a third embodiment.
Figure 15:
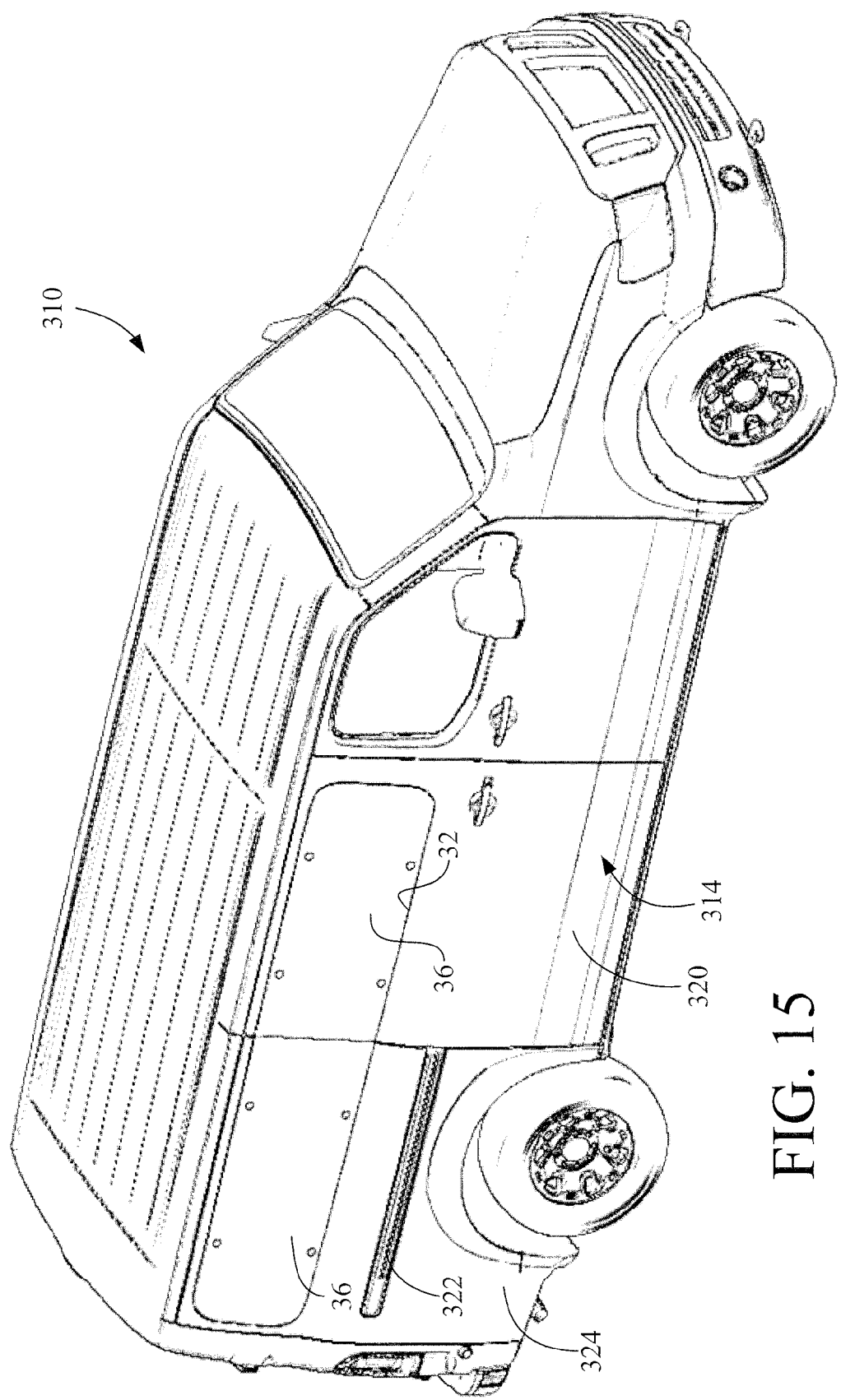
FIG. 15 is another perspective view of the vehicle and the body side structure depicted in FIG. 14, showing the sliding door with the removable portion removed outer window area of the outer side panel and a window assembly attached to the outer side panel in accordance with the third embodiment.

Referring now to FIGS. 14 and 15, a vehicle 310 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle 310 includes a sliding door 314 that is made from an outer side panel 320 and an inner side panel (not shown). The outer side panel 320 includes the window sash 60, the recessed portion 104 and the removable portion 30 that allows for the outer side panel 320 to be windowless, as shown in FIG. 14 or, when the removable portion 30 is removed, the window assembly 36 can be installed to the outer side panel 320 of the sliding door 314, as shown in FIG. 15.

It should be understood from the drawings and the description herein that the outer side panel 320 has a corresponding inner side panel (not shown) that is the same as the rearward inner side panel 22 of the first embodiment in that it similarly has a removable support part 40 corresponding to the removable portion 30.

The sliding door 314 includes conventional sliding mechanisms, including roller assemblies (not shown), upper and lower tracks (not shown) and a central track 322 that is formed and/or installed to a rearward outer side panel 324. The rearward outer side panel 324 and a corresponding rearward inner side panel (not shown) are also made in a manner consistent with the rearward outer side panel 20 and rearward inner side panel 22 of the first embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body side structure. Accordingly, these terms, as utilized to describe the present invention should be interpreted relative to a vehicle equipped with the vehicle body side structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle body side structure comprising:
a first pillar
a second pillar,
an inner side panel defining an inner window opening and an attachment flange formed adjacent to and surrounding the inner window opening; and an outer side panel having an uninterrupted outer surface, the outer side panel extending between the first pillar and the second pillars, a section of the uninterrupted outer surface being contoured and shaped to define an outer window-like area and a window sash formed adjacent to and surrounding the outer window-like area, the attachment flange of the inner side panel being rigidly attached to the window sash of the outer side panel along a connection area to prevent movement of the inner side panel relative to the outer side panel, the outer window-like area being located adjacent to the connection area and the outer window-like area completely covering the inner window opening, the connection area being located between the first pillar and the second pillar and spaced apart from the first pillar and the second pillar, with respective lateral end portions of the inner panel and the outer panel defining an enclosed area as viewed in cross-section between the connection area and at least one of the first pillar and the second pillar.

2. The vehicle body side structure according to claim 1, wherein
the attachment flange is attached to the window sash around substantially the entire perimeter of the window sash.

3. The vehicle body side structure according to claim 1, wherein
the attachment flange is rigidly attached to the window sash with a structural adhesive material.

4. The vehicle body side structure according to claim 3, wherein
the structural adhesive attaches substantially all of the attachment flange to substantially all of the window sash.

5. The vehicle body side structure according to claim 3, wherein
the attachment flange is spaced apart from the window sash by a gap that is between 0.02 mm and 1.0 mm when the attachment flange is attached to the window sash, with the structural adhesive filling the gap between the attachment flange and the window sash.

6. The vehicle body side structure according to claim 3, wherein
the attachment flange is spaced apart from the window sash by a gap that is 0.5 mm when the attachment flange is attached to the window sash, with the structural adhesive filling the gap between the attachment flange and the window sash.

7. The vehicle body side structure according to claim 3, wherein
the structural adhesive is encapsulated between the attachment flange and the window sash.

8. The vehicle body side structure according to claim 1, wherein
one of the first pillar and the second pillar has a pillar portion that is connected at a first side to the outer side panel and connected at a second side to the inner side panel such that the connections between the outer side panel, the inner side panel and the pillar portion form a closed box section when viewed in cross-section.

9. The vehicle body side structure according to claim 1, wherein
the outer side panel and the inner side panel form a first closed box section with the first pillar and a second closed box section with the second pillar.

10. The vehicle body side structure according to claim 1, wherein
the outer window-like area defines a removable portion that is configured such that with the removable portion removed, the connection area surrounds a window opening and a window assembly having a window glass is installed to the connection area and spans across the window opening created with the removable portion removed from the outer window-like area.

11. The vehicle body side structure according to claim 1, further comprising
a third pillar, such that the outer side panel and inner side panel extend between the first pillar and the second pillar;
a second inner side panel defining a second inner window opening and a second attachment flange formed adjacent to and surrounding the second inner window opening; and
a second outer side panel extending between the second pillar and the third pillar, and having a second uninterrupted outer surface, a section of the uninterrupted outer surface being contoured and shaped to define a second outer window-like area and a second window sash formed adjacent to and surrounding the second outer window-like area, the second attachment flange of the second inner side panel being rigidly attached to the second window sash along a second connection area to prevent movement of the second inner side panel relative to the second outer side panel, the second outer window-like area being located adjacent to the second connection area and the second outer window-like area completely covering the second inner window opening, the second connection area being located between the second and third pillars and spaced apart from the second and third pillars.

12. The vehicle body side structure according to claim 1, wherein
the outer side panel has an outer surface, and the window sash is recessed with respect to the outer surface.

13. The vehicle body side structure according to claim 1, wherein
the inner side panel has a removable support part that spans across at least a portion of the inner window opening.

14. The vehicle body side structure according to claim 13, wherein
the inner window opening is configured such that for a windowless arrangement the inner window opening retains the removable support part and for a window opening the removable support part is removed.

15. A method of assembling a vehicle body side structure, comprising:
providing an outer side panel having an uninterrupted outer surface, a portion of the outer side panel attaching to a first pillar and another portion of the outer side panel attaching to a second pillar, a section of the outer surface being contoured and shaped to define an outer window-like area and a window sash formed adjacent to and surrounding the outer window-like area;
providing an inner side panel having an inner window opening and an attachment flange formed adjacent to and surrounding the inner window opening, a portion of the inner side panel attaching to the first pillar and another portion of the inner side panel attaching to the second pillar,
aligning the outer window-like area and the inner window opening such that the outer window-like area completely covers the inner window opening; and
non-movably and rigidly attaching the attachment flange of the body inner side panel to the window sash of the outer side panel defining a connection area with the outer window-like area completely covering the inner window opening with the connection area being located between the first pillar and the second pillar and spaced apart from the first pillar and the second pillar, and with lateral end portions of the inner panel and the outer panel defining an enclosed area as viewed in cross-section between the connection area and at least one of the first pillar and the second pillar.

16. The method of assembling a vehicle body side structure according to claim 15, further comprising removing the section of the outer surface that defines the outer window-like area from the outer side panel to form a window opening.

17. The method of assembling a vehicle body side structure according to claim 15, further comprising attaching the outer side panel and the inner side panel to a side rear panel to form a closed box section.

18. The method of assembling a vehicle body side structure according to claim 15, wherein performing the attaching of the attachment flange to the window sash includes applying a structural adhesive to at least one of the attachment flange and the window sash.

19. The vehicle body side structure according to claim 1, wherein the outer side panel has an outer periphery including the lateral end portion and a second lateral end portion with the lateral end portion attached to the first pillar and the second lateral end portion attached to the second pillar, and the connection area being spaced apart from the outer periphery of the outer side panel.

20. The method of assembling a vehicle body side structure according to claim 15, wherein the non-movably and rigidly attaching the attachment flange of the body inner side panel to the window sash of the outer side panel includes the connection area being spaced apart from the outer periphery of the outer side panel, the outer periphery of the outer side panel including the lateral end portion and a second lateral end portion, and the providing the outer side panel includes the lateral end portion of the outer side panel attaching to the first pillar and the second lateral end portion of the outer side panel attaching to the second pillar.

* * * * *